US012581230B2

(12) United States Patent
Otis

(10) Patent No.: US 12,581,230 B2
(45) Date of Patent: Mar. 17, 2026

(54) MULTIWIRE LOUDSPEAKER SYSTEM

(71) Applicant: Matthew R. Otis, Keswick, VA (US)

(72) Inventor: Matthew R. Otis, Keswick, VA (US)

(73) Assignee: Matthew R. Otis, Keswick, VA (US)

( * ) Notice: Subject to any disclaimer, the term of this patent is extended or adjusted under 35 U.S.C. 154(b) by 135 days.

(21) Appl. No.: 18/583,786

(22) Filed: Feb. 21, 2024

(65) Prior Publication Data

US 2025/0267396 A1 Aug. 21, 2025

(51) Int. Cl.

*H04R 1/28* (2006.01)
*H04R 1/02* (2006.01)
*H04R 9/02* (2006.01)
*H04R 9/04* (2006.01)
*H04R 9/06* (2006.01)
*H04R 31/00* (2006.01)

(52) U.S. Cl.

CPC ........... *H04R 1/2896* (2013.01); *H04R 1/025* (2013.01); *H04R 9/025* (2013.01); *H04R 9/046* (2013.01); *H04R 9/063* (2013.01); *H04R 9/066* (2013.01); *H04R 31/006* (2013.01)

(58) Field of Classification Search

CPC ...... H04R 1/2896; H04R 1/025; H04R 9/025; H04R 9/046; H04R 9/063; H04R 9/066; H04R 31/006

USPC ........................................................ 381/337

See application file for complete search history.

(56) References Cited

U.S. PATENT DOCUMENTS

| | | | | |
|---|---|---|---|---|
| 2005/0254678 A1* | 11/2005 | Wearing | H04R 5/02 | 381/334 |
| 2009/0092268 A1* | 4/2009 | Mizuno | H04R 5/02 | 381/182 |
| 2012/0183158 A1* | 7/2012 | Tracy | H04R 1/26 | 381/120 |
| 2020/0412223 A1* | 12/2020 | Tarelli | H02K 33/14 | |
| 2023/0262393 A1* | 8/2023 | Tracy | H04R 1/025 | 381/77 |

* cited by examiner

*Primary Examiner* — Sean H Nguyen
(74) *Attorney, Agent, or Firm* — POLSINELLI LLP

(57) ABSTRACT

A device may include a wire terminal with a first and second wire connection, and an inertia bar. It may also have a panel that houses the wire terminal, a first speaker, and a second speaker. The panel may include one or more conduits for a speaker wire, which connects the first speaker and the second speaker to the first and second wire connections, respectively. The first speaker may have a first set of electrically activated coils, which includes a portion of the speaker wire between the first wire connection and the second speaker. Similarly, the second speaker may have a second set of electrically activated coils, which includes a second portion of the speaker wire between the first speaker and the second wire connection. The size of the second portion may differ from that of the first portion. Additionally, the inertia bar may connect the first and second speakers.

10 Claims, 9 Drawing Sheets

506A

MULTIWIRE LOUDSPEAKER SYSTEM

TECHNICAL FIELD

This disclosure relates generally to loudspeakers. More specifically, this specification relates to the magnetic distributed mode actuators and distributed mode loudspeakers,

BACKGROUND

For decades, traditional loudspeakers have been utilized extensively to convert electrical audio signals into audible sound waves. These speakers feature a diaphragm, commonly known as a "cone," which moves up and down in a piston-like motion to generate sound waves. This movement is achieved with the aid of electromagnetic coils and magnets or piezoelectric actuators. Despite being effective in sound reproduction, traditional loudspeakers are restricted by size, shape, and frequency response limitations which may affect their performance and flexibility in diverse applications. Additionally, the piston-like movement of diaphragms could generate unwanted resonances and directional sound patterns.

Distributed mode loudspeakers (DMLs) function by inducing vibrational modes across a panel's surface. Electro-acoustic actuators, including electromagnetic coils and magnets or piezoelectric actuators, are utilized in achieving this. When electrical audio signals are applied to these actuators, the panel vibrates, producing sound waves that propagate through the air. There is a need for innovation and refinement in the design and operation of flat panel audio loudspeakers, including DMLs.

SUMMARY

The technology described in this patent involves a system for connecting two speakers in a panel using a wire terminal and an inertia bar. The panel is designed to house the wire terminal, which has a first wire connection and a second wire connection. The first speaker and the second speaker are also connected to the wire terminal, with the first speaker and speaker wire connected to the first wire connection and the second speaker and second wire connection connected to the second wire connection.

The panel also includes one or more conduits for a speaker wire, which allows the wire to pass through the panel without interfering with other components. The first speaker comprises a first set of electrically activated coils, which includes a portion of the speaker wire between the first wire connection and the second speaker. The second speaker comprises a second set of electrically activated coils, which includes a second portion of the speaker wire between the first speaker and the second wire connection. The second portion of the wire has a different size than the first portion, which allows for optimal sound quality. The inertia bar connects the first speaker and the second speaker, which ensures that the two speakers move in unison and produce a consistent sound.

To put this technology into practice, imagine a home theater system with two speakers mounted on either side of the TV. The system would use the wire terminal, inertia bar, and panel to connect the two speakers and ensure they produce high-quality sound. The speaker wire would run through the conduits in the panel, and the first and second sets of electrically activated coils would be connected to the wire terminal. The inertia bar would be positioned between the two speakers, connecting them and ensuring they move in sync.

In one general aspect, the multi-wire loudspeaker may include a wire terminal having a first wire connection and a second wire connection. The multi-wire loudspeaker may also include an inertia bar. the multi-wire loudspeaker may furthermore include a panel that is configured to house the wire terminal, a first speaker and a second speaker, where the panel includes one or more conduits for a speaker wire, where the first speaker and the speaker wire is connected to the first wire connection the first speaker, the second speaker, and the second wire connection, the multi-wire loudspeaker may in addition include the first speaker having a first set of electrically activated coils, where the first set of electrically activated coils includes a first portion of the speaker wire between the first wire connection and the second speaker. the multi-wire loudspeaker may moreover include the second speaker having a second set of electrically activated coils, where the second set of electrically activated coils may include a second portion of the speaker wire between the first speaker and the second wire connection, where the second portion has a size of wire that is different than the first portion. the multi-wire loudspeaker may also include where the inertia bar connects the first speaker and the second speaker. Other embodiments of this aspect include corresponding computer systems, apparatus, and computer programs recorded on one or more computer storage devices, each configured to perform the actions of the methods.

Implementations may include one or more of the following features: the first set of electrically activated coils may include a third portion of speaker wire between the second speaker and the second wire connection, where the third portion of speaker wire has a size of wire that is different from both the first portion and the second portion. The speaker wire is connected in series to the first wire connection, the first speaker, a junction point, the second speaker, the junction point, and the second wire connection. The multi-wire loudspeaker may include a magnet disposed along the inertia bar adjacent to the first set of electrically activated coils. the multi-wire loudspeaker may include a magnet disposed along the inertia bar adjacent to the second set of electrically activated coils. The first speaker further may include a rod that has a proximal end adjacent to the first set of electrically activated coils and a distal end that extends into the panel. The proximal end is smaller than the distal end. The rod has an exterior portion of a rigid material and an interior portion with an acoustic enhancement material. The inertia bar includes a first portion adjacent to the first speaker and a second portion adjacent to the second speaker. The inertia bar includes two inertia bars. Implementations of the described techniques may include hardware, a method or process, or a computer tangible medium.

In one general aspect, a sound speaker may include a magnet disposed adjacent to a set of electrically activated coils. The sound speaker may also include the set of electrically activated coils having a first portion of wire having a first gauge and a second portion of wire having a second gauge, where the first gauge is different from the second gauge. Other embodiments of this aspect include corresponding computer systems, apparatus, and computer programs recorded on one or more computer storage devices, each configured to perform the actions of the methods.

Implementations may include one or more of the following features. The sound speaker may include a panel that is configured to house a wire terminal, the magnet, and the set of electrically activated coils, where the set of electrically activated coils has a first connection point that is connected to a first wire connection of a wire terminal and a second connection point that is connected to a second wire connection of the wire terminal. The sound speaker may include a rod that has a proximal end adjacent to the set of electrically activated coils and a distal end that extends into the panel. The rod has an exterior portion of a rigid material and an interior portion with an acoustic enhancement material. The magnet is attached to an inertia bar that extends from a first portion of the panel to a second portion of the panel, where the set of electrically activated coils is between the first portion and the second portion. The set of electrically activated coils is a single voice coil, where the single voice coil is disposed between the first portion and the second portion, where the proximal end of the rod is connected to the single voice coil. Implementations of the described techniques may include hardware, a method or process, or a computer tangible medium.

In one general aspect, the method may include forming a housing for enclosing a sound speaker. The method may also include connecting a wire terminal having a first wire connection and a second wire connection. The method may furthermore include mounting an inertia bar to the housing, where the inertia bar is coupled to a magnet. The method may in addition include disposing a set of electrically activated coils within the housing, where the set of electrically activated coils that include a first portion of wire having a first gauge and a second portion of wire having a second gauge, where the first gauge is different from the second gauge. Other embodiments of this aspect include corresponding computer systems, apparatus, and computer programs recorded on one or more computer storage devices, each configured to perform the actions of the methods.

Implementations may include one or more of the following features. The method may include inserting a rod having a proximal end adjacent to the set of electrically activated coils and a distal end into the housing. The rod has an exterior portion of a rigid material and an interior portion with an acoustic enhancement material. The method includes attaching the magnet to an inertia bar that extends from a first portion of the housing to a second portion of the housing, where the set of electrically activated coils is between the first portion and the second portion. Implementations of the described techniques may include hardware, a method or process, or a computer tangible medium.

DETAILED DESCRIPTION

For decades, traditional loudspeakers have been utilized extensively to convert electrical audio signals into audible sound waves. These speakers feature a diaphragm, commonly known as a "cone," which moves up and down in a piston-like motion to generate sound waves. This movement is achieved with the aid of electromagnetic coils and magnets or piezoelectric actuators. Despite being effective in sound reproduction, traditional loudspeakers are restricted by size, shape, and frequency response limitations which may affect their performance and flexibility in diverse applications. Additionally, the piston-like movement of diaphragms could generate unwanted resonances and directional sound patterns.

Flat panel audio loudspeakers, such as DMLs, provide an innovative solution for audio reproduction. Unlike traditional speakers, DMLs function by inducing vibrational modes across a panel's surface. Electro-acoustic actuators, including electromagnetic coils and magnets or piezoelectric actuators, are utilized in achieving this. When electrical audio signals are applied to these actuators, the panel vibrates, producing sound waves that propagate through the air. DMLs present several advantages over traditional loudspeakers. They can be designed with a slim profile, making them applicable in limited spaces. Additionally, their distributed vibrational modes provide augmented dispersion properties and fewer resonances, leading to more immersive and natural sound reproduction. Nevertheless, there is still a need for further innovation and refinement in the design and operation of flat panel audio loudspeakers, including DMLs.

Figure 1:
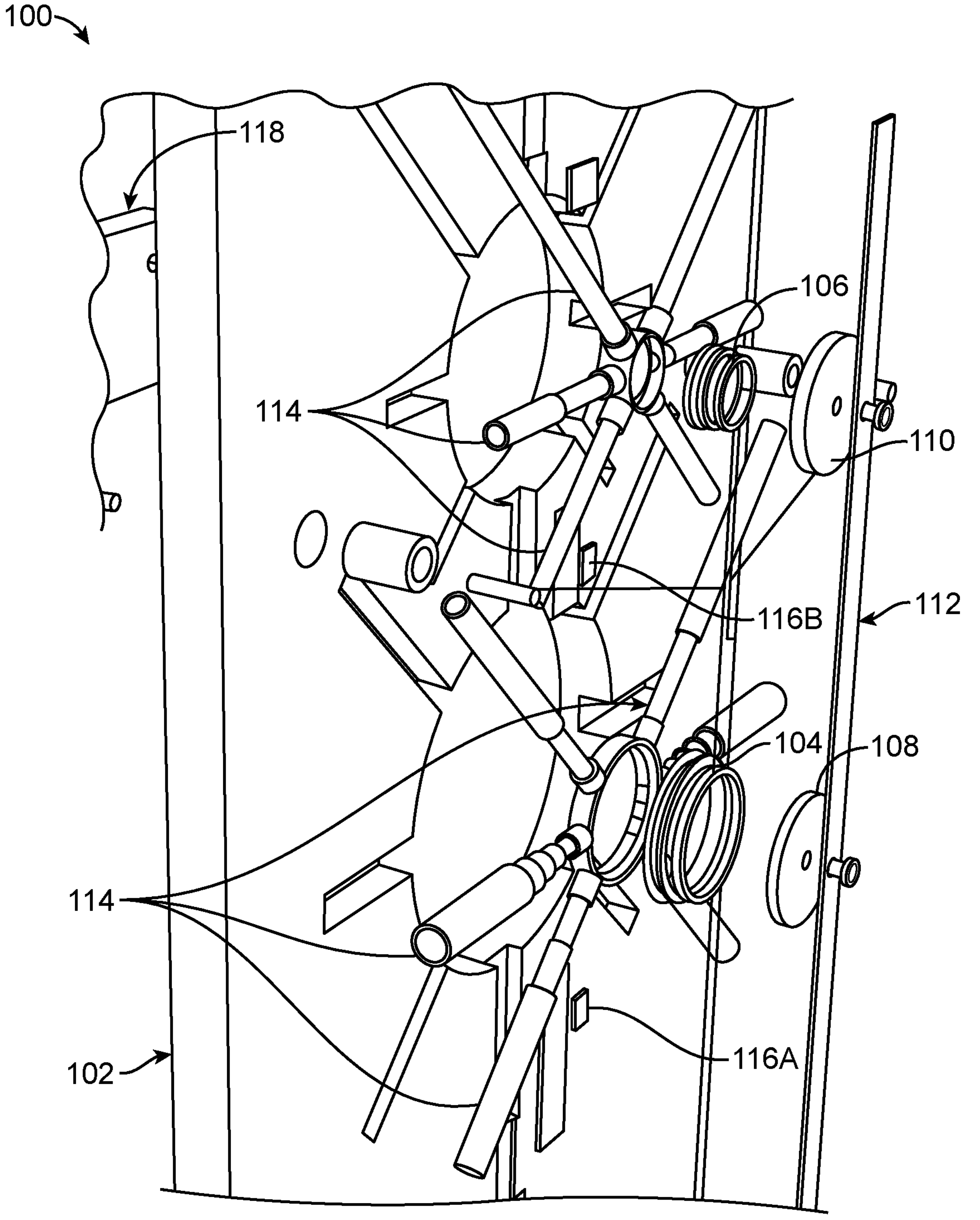
FIG. 1 depicts a multi-wire loudspeaker system in accordance with some embodiments of the present disclosure.

Turning now to the figures, FIG. 1 depicts a multi-wire loudspeaker system (e.g., a sound speaker) in accordance with some embodiments of the present disclosure. More specifically, the multi-wire loudspeaker 100 includes a panel 102, a first set of electrical coils 104, a second set of electrical coils 106, a first magnet 108, a second magnet 110, an inertia bar 112, a set of rods 114, a set of absorbers 116 and a mounting assembly 118.

The panel 102 may be formed of rigid or semi-rigid material such as a blend of acoustical materials that have an aesthetic design. The panel 102 may provide physical support for the components of the speaker described below, aids in the acoustic performance of the speaker system, and various design elements. In some embodiments, the panel 102 may be formed of acoustic foam, medium-density fiberboard (MDF), plywood (e.g., with veneer or soft core), hardwoods, or metals such as aluminum or steel. The panel 102 may include combinations of any of these materials and may be treated or coated for added visual appeal and corrosion resistance. In other embodiments where weight is a design factor, such as in wall-mounted systems, lighter materials like acrylic or composite panels may be used. While FIG. 1 depicts a single panel 102, the multi-wire loudspeaker 100 may be formed with multiple panels and acoustic principles based on the intended use of the system. For example, the multi-wire loudspeaker 100 may include a pair of loudspeakers mounted on either side of the panel 102, providing a balanced output for music listening. In other embodiments, multiple panels 102 are used to form the multi-wire loudspeaker 100. The panel 102 may include the mounting assembly 118. The mounting assembly 118 may include standard wall-mounting brackets such as brackets attached wall studs providing a secure attachment point. In some examples, the mounting assembly 118 may include metal or dense wood that may require more robust mounting solutions such as a French cleat system, which distributes the weight across a larger area of the wall. In some embodiments, the multi-wire loudspeaker 100 may be mounted in a recessed configuration, where part of the wall is cut away to accommodate the panel 102.

The multi-wire loudspeaker 100 may include one or more sets of electrical coils such as the first set of electrical coils 104, and the second set of electrical coils 106 (collectively "sets of electrical coils 104-106," commonly known as voice coils. The sets of electrical coils 104-106 are formed of intricately wound conductive wire and are the primary components through which electrical audio signals are converted into mechanical vibrations, ultimately producing sound. Each set of coils are positioned within a magnetic field of a respective magnet such that when an audio signal passes through each set of coils, the result is a varying magnetic field that interacts with the field of each magnet. The interaction between each magnetic field and the audio signal causes the voice coil, and consequently the attached diaphragm or cone of the speaker, to move back and forth. The movement generates sound waves. The frequency and amplitude of these movements are controlled by the audio signal, allowing the speaker to produce a wide range of sounds that correspond to an original input signal.

Connection to power and an audio source is a key factor to the coil's functionality. Each set of electrical coils may include copper due to its excellent electrical conductivity and durability. For example, copper wires can efficiently carry the audio signal with minimal resistance, making them advantageous for producing high-quality sound. In some embodiments, such as for lighter weight multi-wire loudspeakers 100, such as in portable or small loudspeaker systems, aluminum may be used. Aluminum has a lower density than copper, reducing the overall weight of the coil, but it also has lower conductivity. Another option is silver, which has the highest electrical conductivity of all metals. While more expensive, silver wire can offer superior performance in high-end or specialized audio equipment, where cost is less of a concern and audio fidelity is of the utmost importance.

The design of each set of electrical coils also impacts the speaker's performance using factors such as a number of turns in each coil, the gauge of the wire, and the coil's impedance. The electrical coils may be tailored to match the specific requirements of the speaker system. For instance, a larger number of turns or a thicker wire gauge increases the coil's impedance, which can be advantageous for certain types of amplifiers or audio setups. In some embodiments, the first set of electrical coils 104 and/or the second set of electrical coils 106 may comprise multiple gauges of wire. For example, the first set of coils 104 may include a first portion of wire having a first gauge and a second portion of wire having a second gauge. Similarly, the second set of coils 106 may include a third portion of wire having a third gauge and a fourth portion of wire having a fourth gauge.

The multi-wire loudspeaker 100 may include the first magnet 108 and the second magnet 110. The first magnet 108 and/or the second magnet 110 may be either a permanent magnet or an electromagnet. In some embodiments, the first magnet 108 or the second magnet 110 may be formed of rare earth, such as Neodymium or other magnetic material. While FIG. 1 depicts the first magnet 108 and the second magnet 110, this configuration is not limiting and more or less magnets may be included. In most cases, the sets of electrical coils 104-106 described above will have a corresponding magnet. The first magnet 108 or the second magnet 110 may be mounted to the inertia bar 112 that is discussed herein next.

The inertia bar 112 is configured to enhance sound quality by mitigating undesirable vibration. The mass and position of the inertia bar 112 increases the overall inertia of the moving parts which suppresses vibrations that are not part of the intended sound production. As illustrated by FIG. 1, the inertia bar 112 may be coupled to the first magnet 108 or the second magnet 110, or both. In some embodiments, one or more inertia bars (e.g., two inertia bars, three inertia bars, etc.) may be used with weights and materials based on the weight and strength of the magnet. The inertia bar may be attached (e.g., mechanically, magnetically, etc.) to either the first magnet 108, the second magnet 110, or both. Additional details of the inertia bar are described in U.S. Pat. No. 11,317,212, which is incorporated by reference for all purposes herein.

The set of rods 114 is disposed adjacent to each of the set of coils 104-106. While FIG. 1 depicts a particular number and configuration of rods, this is not limiting. The number and sizes of each rod in the set of rods 114 may be configured to match any of the size of the set of coils, a set of target frequencies for the loudspeaker (e.g., bass, tweeter, mid-range). Each rod of the set of rods 114 has a proximal end portion (e.g., a portion of the rod adjacent to the set of coils) and a distal end portion (e.g., a portion of the rod distant from the set of coils. In some embodiments, the set of rods 114 may be formed of carbon fiber, wood, metal, polymer, or any substance such that the sound is conducted along the rod from the proximal end portion toward the distal end portion. Additionally, each rod of the set of rods 114 may have a shape which is configurable based on the target frequencies, the ambient environment, or other factors. In some examples, the shape of a rod may be a cylinder, or a portion of a cone (e.g., with the end of the cone cut-off). Each rod of the set of rods has an exterior portion of a rigid material (e.g., carbon fiber) and an interior portion with an acoustic enhancement material such as acoustic gel, a sound guide, or other material that enhance the output of the speaker and reduce the distortion.

The set of absorbers 116 may be configured to attenuate internal sound reflections and resonances within the multi-wire loudspeaker 100. These components are typically fashioned from materials with sound-absorbing properties, like acoustic foam, fiberglass, or other porous substances. The set of absorbers 116 may include more than one absorber such as an absorber for each of the set of coils 104-106 (e.g., a bass absorber, a mid-range absorber, etc.). As illustrated by FIG. 1, the set of absorbers 116 includes a bass absorber 116A and a mid-range absorber 116B. In this configuration, the position for each absorber of the set of absorbers 116 involves a strategic positioning to target specific internal wave paths and standing wave patterns, thereby ensuring a more even and controlled damping effect throughout the speaker's operating frequency range. By reducing the unwanted sound energy within the loudspeaker, the set of absorbers 116 help in maintaining the purity of the sound waves emitted towards the listener. This results in a reduction of acoustic coloration and distortion, thereby enhancing the overall sound quality and clarity of the loudspeaker.

Figure 2:
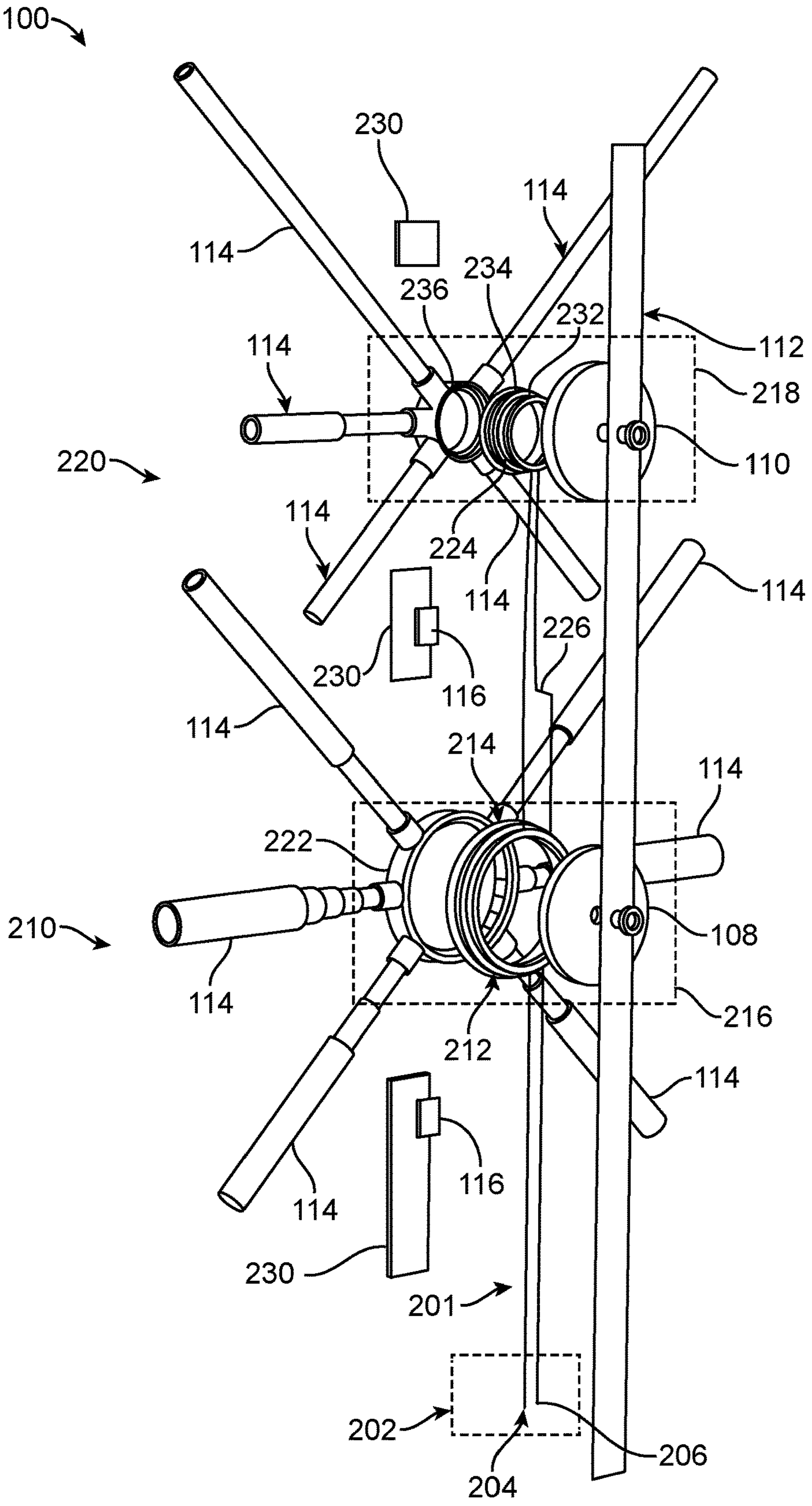
FIG. 2 depicts an expanded view of a multi-wire loudspeaker system (with panel removed) in accordance with some embodiments of the present disclosure.

FIG. 2 depicts an expanded view of a multi-wire loudspeaker system (with panel removed) in accordance with some embodiments of the present disclosure. As described above, the multi-wire loudspeaker 100 includes the first set of electrical coils 104, the second set of electrical coils 106, the first magnet 108, the second magnet 110, the inertia bar 112, the set of rods 114, and the set of absorbers 116.

The multi-wire loudspeaker 200 includes a speaker wire 201 including a wire terminal 202, the inertia bar 112, a panel (not shown in FIG. 2) that is configured to house the wire terminal 202, a first speaker 210 and a second speaker 220. The wire terminal 202 includes a first wire connection 204 and a second wire connection 206. The first speaker 210 and the speaker wire 201 are connected to the first wire connection 204, the first speaker 210, the second speaker 220, and the second wire connection 206.

The speaker wire 201 may be a conduit for electrical signals, transmitting audio from an amplifier or audio receiver to the first speaker 210 and/or the second speaker 220. In some embodiments, the speaker wire may be composed of copper, due to its excellent conductivity and relatively low cost. The speaker wire 201 facilitates the flow of electrical currents. In an example where the speaker wire 201 is formed from cooper, the copper is often oxygen-free, enhancing its conductivity and resistance to corrosion. The speaker wire 201 may have a gauge such any of the gauges defined by the American Wire Gauge (AWG) or other wire gauge standards.

The speaker wire connects the first wire connection 204 to the first speaker 210. The first speaker 210 may include a first set of electrically activated coils 212. The first set of electrically activated coils 212 includes a portion of the speaker wire 201 between the first wire connection and the second speaker 220. The first speaker 210 includes a voice coil 214, a first speaker subassembly 216, a second speaker subassembly 218, and a first mounting ring 222. The voice coil 214 is formed by one or more portions of the speaker wire 201 being wrapped around the first speaker subassembly 216 and/or the second speaker subassembly 218. In some configurations, the portion of speaker wire wrapped around the first speaker subassembly 216 may have a different gauge than the portion of speaker wire 201 wrapped around the second speaker subassembly 218. In some embodiments, each subassembly that has a respective portion of speaker wire 201 wrapped around it may be denoted a single voice coil. As such, a speaker that has multiple subassemblies (e.g., a speaker with the first speaker subassembly 216 and the second speaker subassembly 218) includes multiple voice coils.

The first speaker subassembly 216 and the second speaker subassembly 218 may be formed of polycarbonate, carbon fiber, or other materials. The first speaker subassembly 216 and the second speaker subassembly 218 are disposed such that the voice coil 214 is adjacent to the inertia bar 112. Between the first speaker 210 and the second speaker 220, a junction point 226 may be disposed. The junction point 226 may be an additional wire connection point that connects portions of the speaker wire 201 such as where the gauge of the speaker wire 201 is changed (e.g., a first gauge connecting to a second gauge at the junction point 226. The first mounting ring 222 may be configured to attach to the set of rods 114 that correspond to the first speaker 210. The first mounting ring 222 may be further configured to attach any of the components of the first speaker 210 to the panel.

The second speaker 220 includes a second set of electrically activated coils 224, a second voice coil 232, a third speaker subassembly 234, and a second mounting ring 236. The second set of electrically activated coils 224 includes a second portion of the speaker wire 201 that is disposed between the first speaker 210 and the second wire connection 206. In some configurations the second portion has a size (e.g., a gauge) of wire that is different than the first portion. The second voice coil 232 is formed by one or more portions of the speaker wire 201 being wrapped around the third speaker subassembly 234. The third speaker subassembly 234 may be formed of polycarbonate, carbon fiber, or other materials. The third speaker subassembly 234 may be disposed such that the second voice coil 232 is adjacent to the inertia bar 112.

The second mounting ring 236 may be configured to attach to the set of rods 114 that correspond to the second speaker 220. The second mounting ring 236 may be further configured to attach any of the components of the second speaker to the panel.

In some embodiments, the first set of electrically activated coils 212 include a third portion of the speaker wire 201 between the second speaker 220 and the second wire connection 206. The third portion of speaker wire 201 may have a size (e.g., a gauge) of wire that is different from both the first portion and the second portion. In some configurations, the speaker wire 201 is connected in series to the first wire connection 204, the first speaker 210, the junction point 226, the second speaker 220, the junction point 226, and the second wire connection 206.

The inertia bar 112 may be as described above, and may connect the first speaker and the second speaker. Similar to as described above, the inertia bar 112 may include a fastener 228 that couples the inertia bar 112 to the first magnet 108 or the second magnet 110. In some configurations, the inertia bar 112 may be multiple components such as a first inertia bar that is adjacent to the first speaker 210 and a second inertia bar that is adjacent to the second speaker 220.

As further illustrated by FIG. 2, the set of rods 114 and the set of absorbers 116 may be similar to as described above. In some configurations, the absorbers may be attached to a base surface 230 that may be formed of wood. The set of rods 114 may include various lengths, shapes, and materials. As shown in FIG. 2, each of the first speaker 210 and the second speaker 220 have a corresponding set of rods 114.

Figure 3:
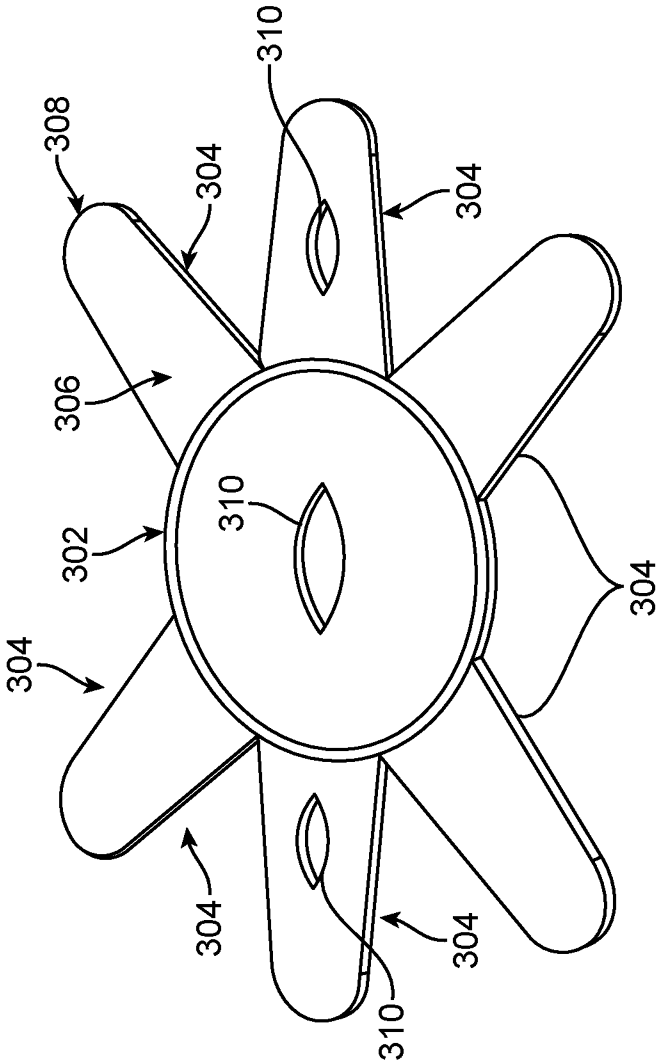
FIG. 3 depicts an example of a voice coil and another configuration of rods in accordance with some embodiments of the present disclosure.

FIG. 3 depicts an example of a voice coil and another configuration of rods in accordance with some embodiments of the present disclosure. The voice coil 302 may be similar to the description above with reference to FIG. 1 or 2. As illustrated in FIG. 3, the set of rods 304 are formed using a different shape profile. In this configuration, the set of rods 304 include a proximal end 306 that may be attached to the voice coil 302 and a distal end 308 that is disposed on a portion of each rod that extends away from the voice coil 302. While the set of rods 304 are shown with a curved region near the distal end 308 and the proximal end 306 attached to the voice coil 302, this is not limiting and any shape such as square, ellipse, triangle, and other geometries.

In some embodiments, one or more rods of the set of rods 304 include a sound director 310. The sound director 310 may be a cavity, a hole, a void, lattice, or other perforation of the corresponding rod. The set of rods 304 may have any number of sound directors 310 and any number of rods may have sound directors 310.

Figure 4:
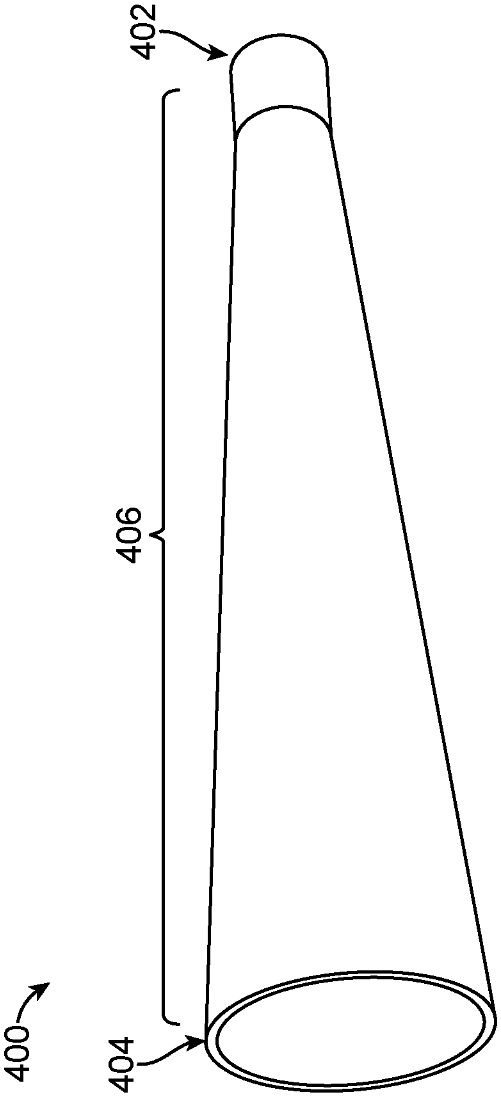
FIG. 4 depicts another example of a rod in accordance with some embodiments of the present disclosure.

FIG. 4 depicts another example of a rod in accordance with some embodiments of the present disclosure. For example, the rod 400 has a first end 402, a second end 404, and an intermediate portion 406. While FIG. 4 illustrates the rod 400 as a conical shape, any shape such as square, rectangle, or other shapes may be used. The first end 402 may be similar to the proximal end of the rods as described above. As such, the first end 402 may include a coupler (not shown) that attaches the first end 402 to the mounting rings or voice coils as described above. The first end 402 may have an area that is less than the area of the second end 404. In between the first end 402 and the second end 404 is the intermediate portion 406. The intermediate portion 406 has a shape that expands in cross-sectional area from the first end 402 and the second end 404.

Figure 5A:
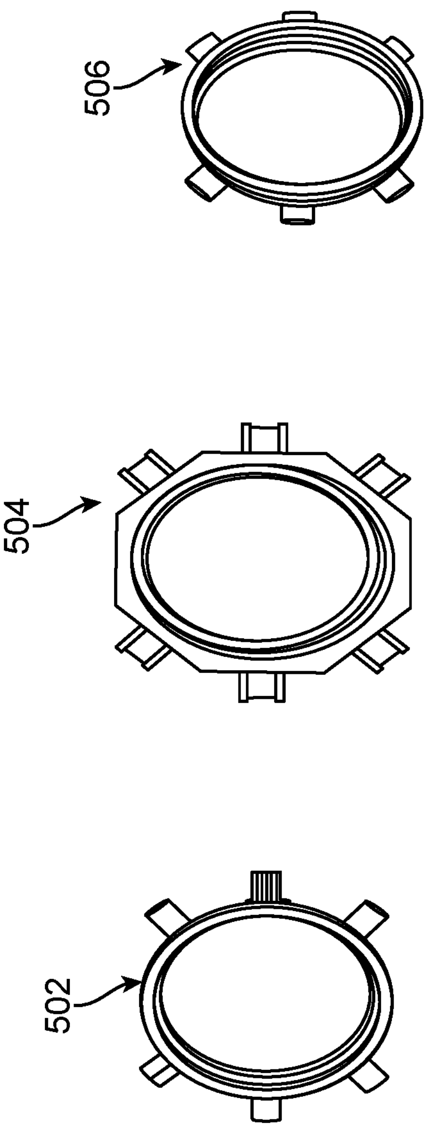
FIGS. 5A-5B depict various views of various configurations of the voice coil, a speaker subassembly, and mounting ring in accordance with some embodiments of the present disclosure.
Figure 5B:
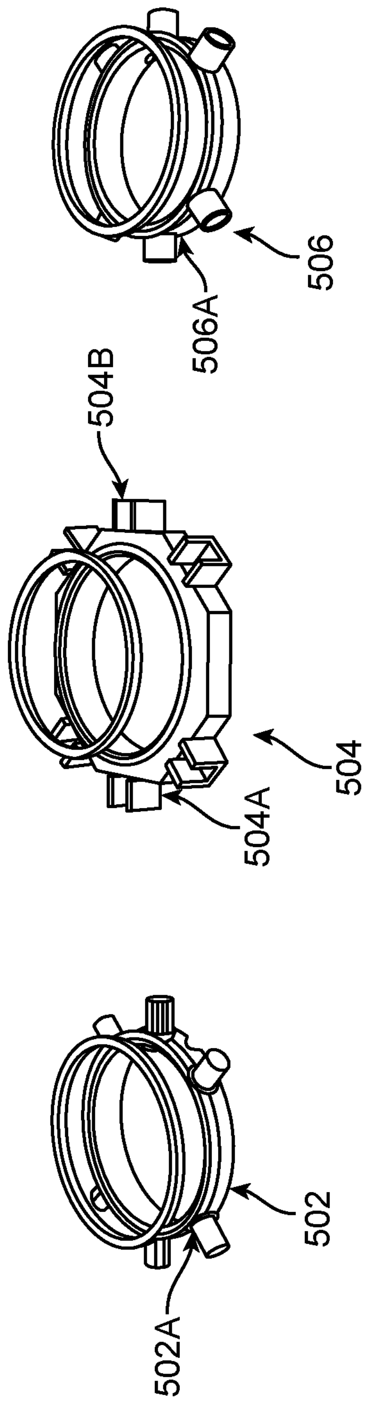

FIGS. 5A-5B depict various views of various configurations of the voice coil, a speaker subassembly, and mounting ring in accordance with some embodiments of the present disclosure. More specifically, FIG. 5A depicts a top-down view of a first configuration 502 a second configuration 504, and a third configuration 506. FIG. 5B depicts a perspective view of a first configuration 502 a second configuration 504, and a third configuration 506.

In the first configuration 502, the mounting ring 502A is a circular shape that includes 6 positions for attaching rods. The first configuration 502 also depicts a hub around which a voice coil may be wrapped as described above with regard to FIGS. 1-4. The hub may be coupled to the mounting ring as described above. In the second configuration 504, the mounting ring 504A is an octagon shape that includes 6 positions for attaching rods. The second configuration 504 also hub around which a voice coil may be wrapped as described above with regard to FIGS. 1-4. In the second configuration 504, the positions to which the rods may be attached, the positions include an attachment point 504B that retains the rod on three sides with an open side on the fourth side. In the third configuration 506, the mounting ring 506A is an octagon shape that includes 6 positions for attaching rods. The third configuration 506 also depicts a hub around which a voice coil may be wrapped as described above with regard to FIGS. 1-4.

Figure 6:
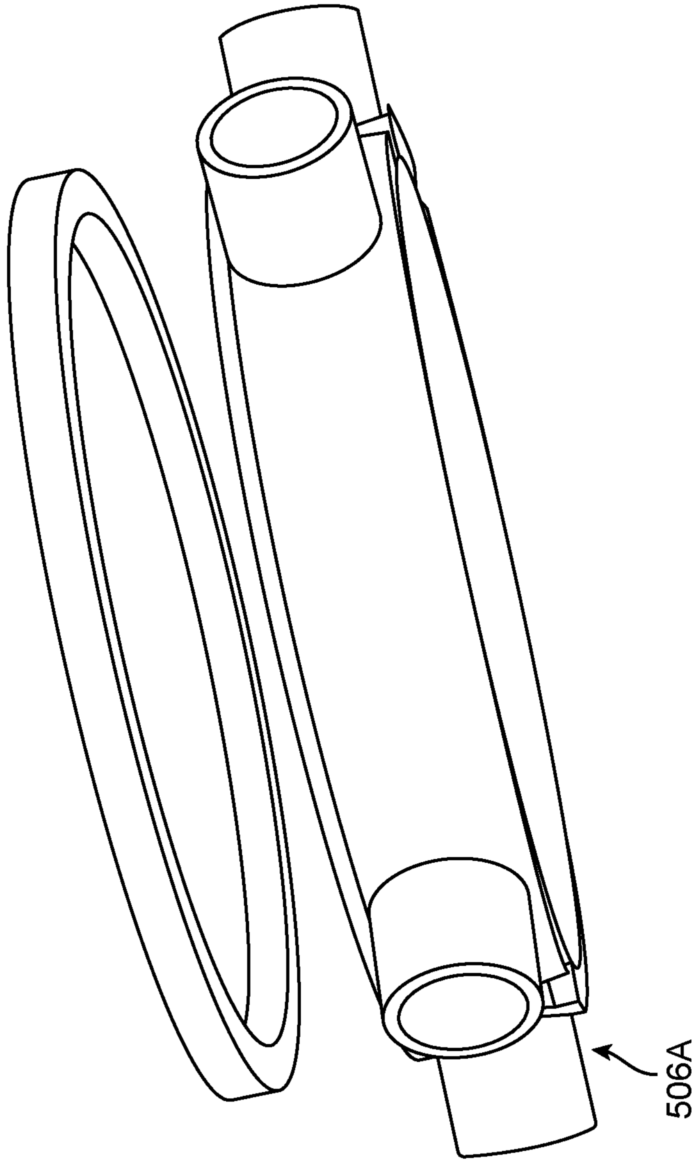
FIG. 6 depicts an expanded view of the third configuration in accordance with embodiments of the present disclosure.

FIG. 6 depicts an expanded view of the third configuration 506 in accordance with embodiments of the present disclosure. As illustrated in FIG. 6, the third configuration 506 includes the voice coil, the mounting ring 506A, and the positions for attaching the rods. As described above, the voice coil wire couples to the mounting ring 506A.

Figure 7:
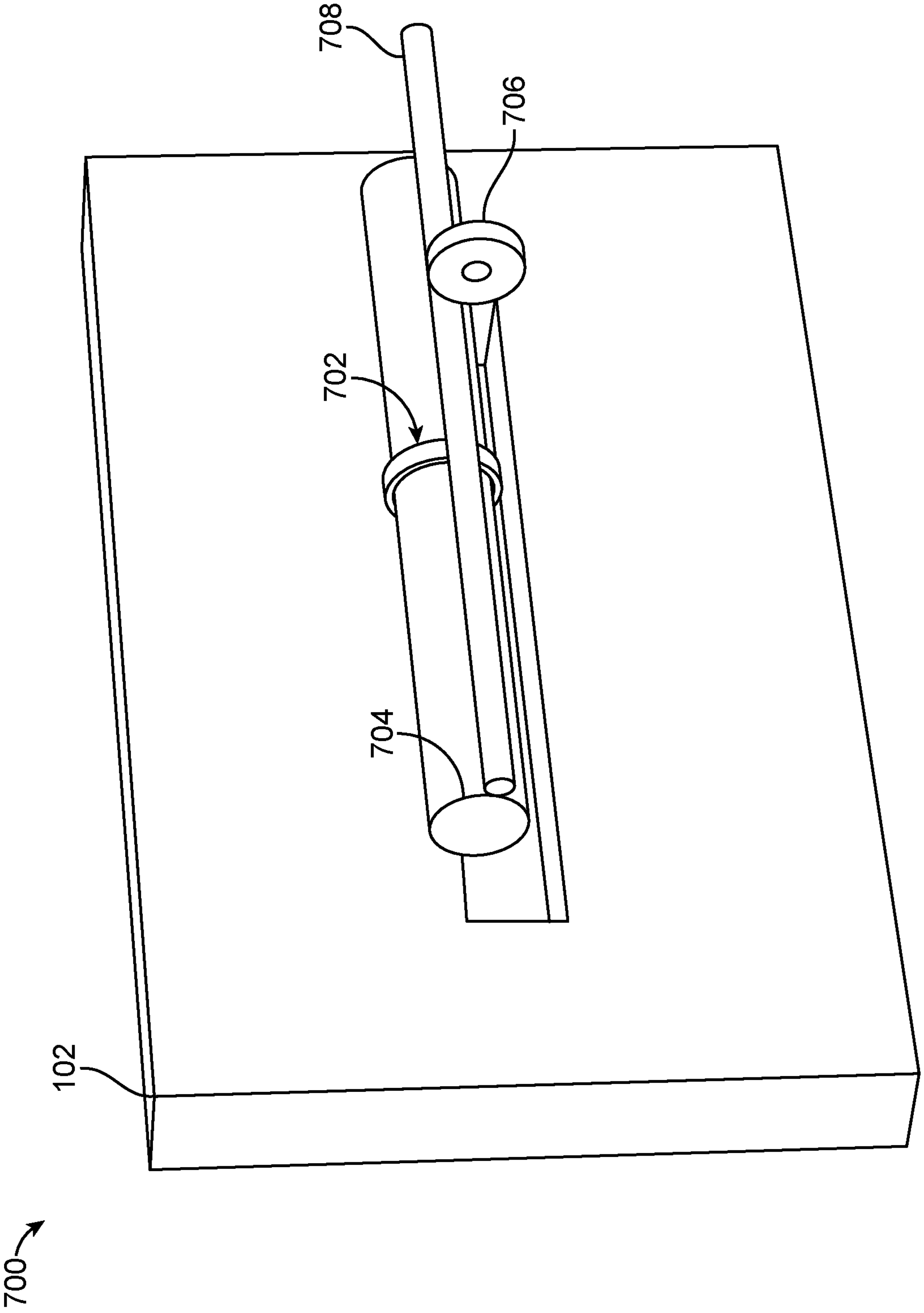
FIG. 7 depicts a subwoofer with a linear motor design in accordance with some embodiments of the present disclosure.

FIG. 7 depicts a subwoofer 700 with a linear motor design in accordance with some embodiments of the present disclosure. More specifically, FIG. 7 focuses on the voice coil 702 and magnet 706 configuration. The subwoofer 700 includes a cylindrical voice coil 702, which is wrapped around a tube 704 which is connected to a foam panel (e.g., such as panel 102). The tube 704 may be designed to be both lightweight and rigid, enabling it to respond accurately to the movements of the voice coil 702 without introducing distortion. The magnet 706 may be placed at one end of the voice coil assembly, with a magnet attachment rod 708 attached to magnet inside the tube 704. The magnet attachment rod 708 may provide a stable axis for the voice coil 702 to move back and forth along, ensuring that the motion is linear and consistent, which is essential for accurate sound reproduction in a subwoofer, especially for the low-frequency sounds they are designed to amplify.

Figure 8:
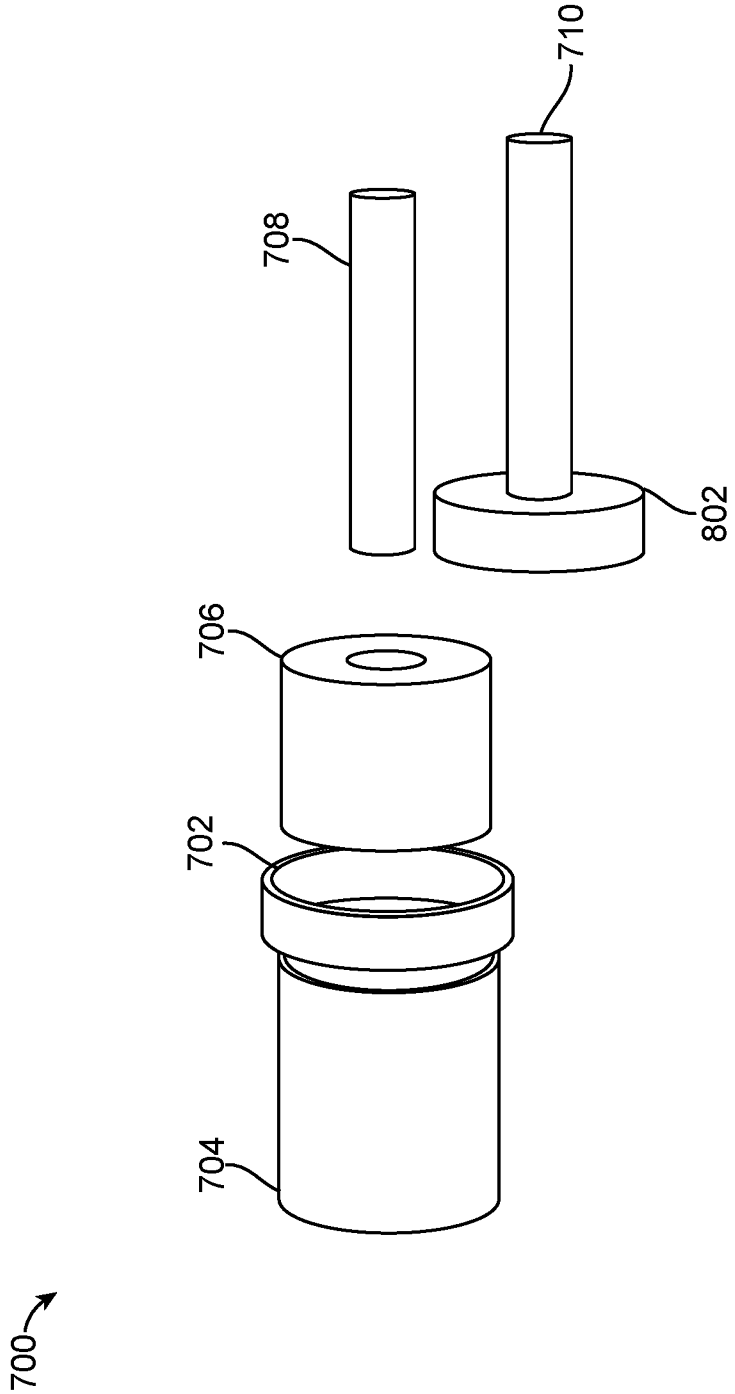
FIG. 8 depicts an expanded view of the subwoofer in accordance with some embodiments of the present disclosure.

FIG. 8 depicts an expanded view of the subwoofer 700 in accordance with some embodiments of the present disclosure. As described above, the subwoofer 700 includes the voice coil 702, the magnet 706, the magnet attachment rod 708, and the tube 704. In some embodiments, the subwoofer 700 includes a plunge rod 710 with an alternative magnet position 802.

Figure 9:
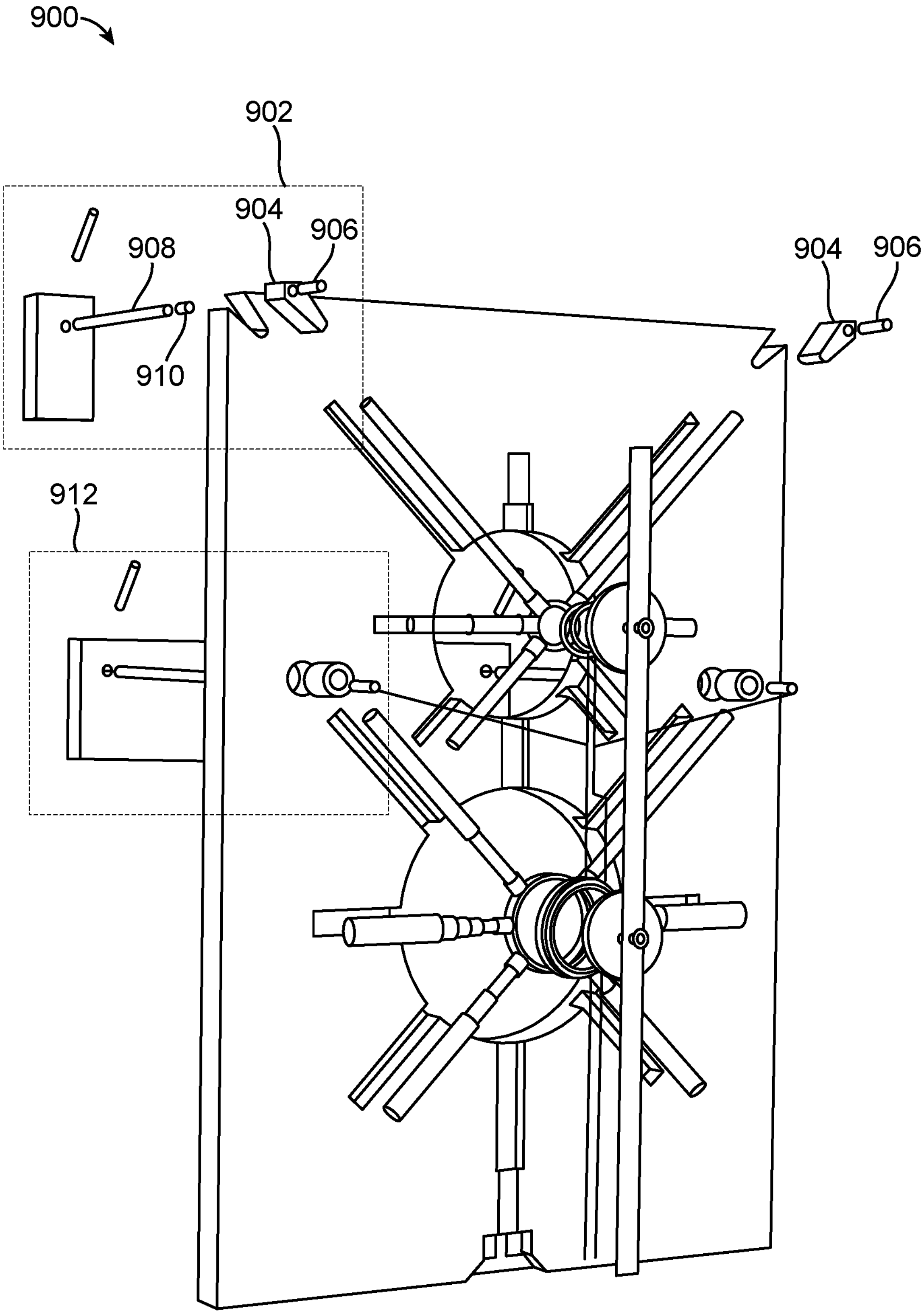
FIG. 9 depicts another perspective of the multi-wire loudspeaker system in accordance with some embodiments of the present disclosure.

FIG. 9 depicts another perspective of the multi-wire loudspeaker system (e.g., a sound speaker) in accordance with some embodiments of the present disclosure. The multi-wire loudspeaker system 900 of FIG. 9 includes elements similar to FIG. 1 and further includes a wall attachment subassembly 902 that includes a wall attachment pin 904, a wall magnet 906, wall support tube 908, magnet wall attachment 910, and a set of voice coil magnetic attachments 912.

Client devices, computing devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 902) include, but is not limited to, desktop computers, laptop computers, server computers, hand-held computers, tablets, smart phones, personal digital representatives, digital home representatives, wearable devices, smart devices, and combinations of these and/or other such computing devices as well as machines and apparatuses in which a computing device has been incorporated and/or virtually implemented.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms “a” and “an” and “the” and other such singular referents are to be construed to include both the singular and the plural, unless otherwise indicated herein or clearly contradicted by context.

As used herein, the terms “comprising,” “having,” “including,” and “containing” are to be construed as open-ended (e.g., “including” is to be construed as “including, but not limited to”), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms “set” (e.g., “a set of items”) and “subset” (e.g., “a subset of the set of items”) is to be construed as a nonempty collection including one or more members unless otherwise indicated or clearly contradicted by context. Furthermore, unless otherwise indicated or clearly contradicted by context, the term “subset” of a corresponding set does not necessarily denote a proper subset of the corresponding set but that the subset and the set may include the same elements (i.e., the set and the subset may be the same).

As used herein, use of conjunctive language such as “at least one of A, B, and C” is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as “as least one of A, B, and C” does not imply a requirement for at least one of A, at least one of B, and at least one of C.

As used herein, the use of examples or exemplary language (e.g., “such as” or “as an example”) is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes, methods, or blocks may be presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 45 U.S.C. § 112(f) will begin with the words “means for”. Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system comprising:

a wire terminal having a first wire connection and a second wire connection;

a panel that is configured to house the wire terminal, a first speaker and a second speaker, wherein the panel includes one or more conduits for a speaker wire, and wherein the first speaker and the speaker wire is connected to the first wire connection, the first speaker, the second speaker, and the second wire connection;

the first speaker comprising a first set of electrically activated coils, wherein the first set of electrically activated coils includes a first portion of the speaker wire between the first wire connection and the second speaker;

the second speaker comprising a second set of electrically activated coils, wherein the second set of electrically activated coils comprises a second portion of the speaker wire between the first speaker and the second wire connection, wherein the second portion has a size of wire that is different than the first portion; and an inertia bar, wherein the inertia bar connects the first speaker and the second speaker.

2. The system of claim 1, wherein the first set of electrically activated coils comprise a third portion of speaker wire between the second speaker and the second wire connection, wherein the third portion of speaker wire has a size of wire that is different from both the first portion and the second portion.

3. The system of claim 2, wherein the speaker wire is connected in series to the first wire connection, the first speaker, a junction point, the second speaker, the junction point, and the second wire connection.

4. The system of claim 1, the system further comprising a magnet disposed along the inertia bar adjacent to the first set of electrically activated coils.

5. The system of claim 1, the system further comprising a magnet disposed along the inertia bar adjacent to the second set of electrically activated coils.

6. The system of claim 1 wherein the first speaker further comprises a rod that has a proximal end adjacent to the first set of electrically activated coils and a distal end that extends into the panel.

7. The system of claim 6, wherein the proximal end is smaller than the distal end.

8. The system of claim 6, wherein the rod has an exterior portion of a rigid material and an interior portion with an acoustic enhancement material.

9. The system of claim 1, wherein the inertia bar includes a first portion adjacent to the first speaker and a second portion adjacent to the second speaker.

10. The system of claim 1, wherein the inertia bar includes two inertia bars.

* * * * *